Oct. 9, 1962 J. R. POWER 3,057,964

MULTIFREQUENCY SIGNALING RECEIVER

Filed Dec. 14, 1959 4 Sheets-Sheet 1

INVENTOR
J. R. POWER
BY
ATTORNEY

Oct. 9, 1962 J. R. POWER 3,057,964

MULTIFREQUENCY SIGNALING RECEIVER

Filed Dec. 14, 1959 4 Sheets-Sheet 2

INVENTOR
J. R. POWER
BY
ATTORNEY

INVENTOR
J. R. POWER
BY [signature]
ATTORNEY

Oct. 9, 1962 J. R. POWER 3,057,964

MULTIFREQUENCY SIGNALING RECEIVER

Filed Dec. 14, 1959 4 Sheets-Sheet 4

INVENTOR
J. R. POWER
BY [signature]
ATTORNEY 3,057,964

MULTIFREQUENCY SIGNALING RECEIVER

James R. Power, Chatham, N.J., assignor to Bell Telephone Laboratories, Incorporated, New York, N.Y., a corporation of New York Filed Dec. 14, 1959, Ser. No. 859,444
10 Claims. (Cl. 179—84)

This invention relates to communications receivers and, more particularly, to receivers in telephone systems employing voice frequency signaling.

Conventional dial signals in the form of direct-current pulses are difficult to use in telephone systems employing electronic switching. Such pulses are blocked or substantially attenuated by line transformers and by the transmission characteristics of remote concentrators which may be located at distances of several miles from the common control equipment of the central office. It has long been recognized that voice frequency dial signals are free from the difficulties noted since they can be transmitted through transformers, line concentrators, and switching networks to dial registers at the central office or to more distant stations if desired.

Various subscriber station set arrangements have been proposed for the generation of voice frequency signals. One such arrangement, employing push-button dialing, is disclosed in Patent No. 2,824,173, issued February 18, 1958 to L. A. Meacham. A chief disadvantage of station set push-button dialing equipment, however, is that its cost exceeds twice that of conventional dialing equipment. Accordingly, considerable attention has been given to the development of modifications to rotary dialing equipment that will provide effective voice frequency signaling at minimal costs. One such modification, for example, is disclosed in the copending application of E. Bruce et al., Serial No. 782,419, filed December 23, 1958, now Patent 2,976,367 issued March 21, 1961.

Although the type of rotary dialing equipment disclosed in the Bruce application provides for the generation of satisfactory voice frequency signals at moderate cost, the problem of providing suitable, complementary voice frequency receiving equipment for a central office has not heretofore been solved. To be fully satisfactory, such receiving equipment must be responsive both to the station identifying information and to the switching information contained in the dial signal and further must not respond to speech or noise voltages that may be present on the line. Further, a degree of flexibility which readily permits party-line expansion is highly desirable. As in the transmitting equipment, the problem of cost is of course critical.

One general object of the invention, therefore, is to provide an improved voice frequency signaling system.

A more specific object of the invention is to provide voice frequency signaling receiving equipment with a high degree of protection against false operation by speech or noise.

A further object is to provide efficient voice frequency signaling receiving equipment that may be readily expanded to accommodate an increased number of subscribers on a party-line.

The principles of the invention are based, in part, on the realization that the characteristics of the type of voice frequency signals generated by modified rotary dial equipment may be uniquely turned to account by relatively simple and yet flexible receiving equipment that provides substantial protection against false operation. Specifically, in a party-line system, the invention contemplates dial signals from each station set that comprise oscillations at a first frequency which are initiated by the operation of dial-off-normal contacts and oscillations at a second lower frequency that are initiated periodically during dial rundown by the operation of pulsing contacts. Advantageously, from the standpoint of maximum utilization of the receiving equipment at the central office end, the lower signal frequency, or pulse frequency, of each station set except one matches the higher frequency, or dial-off-normal frequency, of another station set on the party line. Accordingly, in the application of the principles of the invention to a party line of eight, for example, a total of only nine signaling frequencies are employed even though each individual set employs a unique combination of two frequencies.

In a specific illustrative embodiment of the invention, the signaling receiving equipment comprises an amplifier-limiter in series relation with a parallel array of nine selective amplifiers or filter-amplifiers, each designed to pass and amplify one of the nine frequencies employed on an eight party line. A unique arrangement of double gates is employed to couple the output of the selective amplifiers to the party detector and digit counter equipment. The output of a selective amplifier or filter resulting from the dial-off-normal signal from a particular subset is applied to enable a first gate. When the shift to the lower frequency dial signal is made, the release time of the first gate is sufficiently slow so that a conductive path from the dial pulse selective amplifier through that gate is maintained for an increment of time that is sufficient to permit the dial pulse signal to enable a second gate. The release period of the second gate is in turn sufficiently long to provide a conductive path for the succeeding signal from the dial-off-normal selective amplifier to the corresponding party detector equipment and to the digit counter.

The protection against false operation of a party detector or of the digit counter is thus twofold. The system can be responsive to spurious signals only when such signals comprise each of two of the adjacent signal frequencies employed and further only when such signals are presented to the system in the particular timed sequence which is required for the operation of the corresponding pair of gates. The likelihood of the presence of spurious signals which closely approximate true signals is thus necessarily extremely remote and hence the frequency with which the system may be falsely operated is correspondingly low.

Accordingly, one feature of the invention is the employment in a multiparty, alternating-current, signal receiver of a double gating arrangement between each selective amplifier and its corresponding party detector and a common digit counter.

Another feature of the invention is a multiparty, alternating-current, signal receiver wherein the detecting equipment for each respective party is responsive only to a signal of a first preassigned frequency, followed by a signal of a second preassigned frequency, and followed in turn by a third signal at said first preassigned frequency.

A further feature of the invention is the employment of a plurality of pairs of filters in a multiparty, telephone-signal receiver, wherein each filter pair corresponds to the two frequencies employed by each respective transmitting station and wherein at least one filter of each pair is common to one other pair.

The invention together with additional objects and features thereof will be fully apprehended from a consideration of the following detailed description and accompanying drawing of a particular illustrative embodiment in which.

Figure 1:
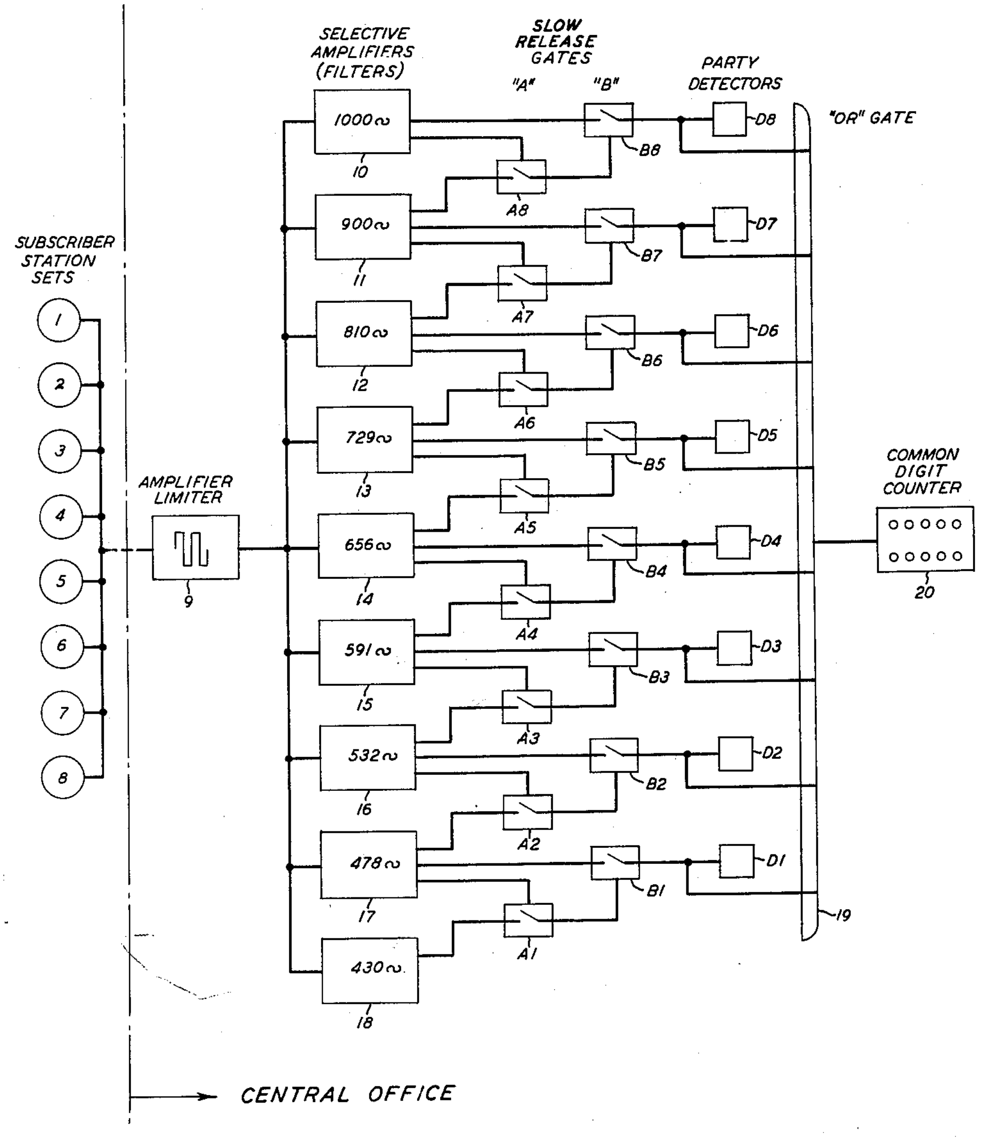
FIG. 1 is a block diagram of a multiparty signaling system in accordance with the invention.

The illustrative embodiment of the invention shown in FIG. 1 is an eight-party-line telephone system. Each of the individual subscriber station subsets 1 through 8 may include any one of a variety of suitable pulse generating arrangements which produces a signal of a first frequency, for station identification purposes, which is interrupted by pulses of a second frequency which denote switching information or, more specifically, the identity of the called party. Although the particular means by which such a pulse train is generated forms no part of the instant invention, a brief explanation of one illustrative subscriber's station set which employs rotary-dialing, alternating-current signaling equipment will contribute to a more complete understanding of the operation of the receiving equipment which is disclosed herein.

Illustrative dialing equipment of the type indicated is shown in FIG. 13 of the copending application of E. Bruce et al., cited above. Bruce shows that the inductor of a tone ringer circuit in a subscriber's station may be employed as a part of the pulse generating circuit for alternating-current rotary-dialing. With the operation of the dial-off-normal switch, stabilizing elements are disconnected from a resonant circuit, which includes the tone-ringer inductor, the resonant circuit is excited, and oscillations at the tone-ringer frequency are generated. At each successive closing of the dial pulse switch during dial rundown, an additional capacitor is introduced into the resonant circuit and the frequency of the oscillations is correspondingly reduced. Stated otherwise, the signal is frequency modulated at the dial pulsing rate and the number of modulations in any particular dial rundown series represents the digit dialed.

The output of each of the station sets 1 through 8 of FIG. 1 is transmitted to the central office receiving equipment which includes an amplifier-limiter 9 with high gain and abrupt overload characteristics. Its output consists of square waves controlled by the zero crossings of the input signal. The amplitude of the square waves is determined by the design of the limiter and their fundamental frequency tends to be that of the highest amplitude component of the input. A desirable signal to noise ratio is assured thereby. The output of the limiter is in turn applied in parallel to each of nine selective amplifiers or filters 10 through 18. Each of the filters is labeled with the particular frequency to which it is responsive. The frequency of each of the first eight of the filters 10 through 17 matches a respective one of the station set dial-off-normal frequencies and the ninth filter 18 matches the lowest pulse frequency of 430 cycles. It will be noted that the responsive frequency of each successive one of the filters 11 through 18 is 10 percent less than the filter with the next higher frequency. The choice of a 10 percent shift in frequency at the transmitting or station set end of the system ensures that each pulse frequency coincides with the next lower dial-off-normal frequency, and it is this concept which permits the dual use of filters at the receiving end. The relatively small difference between any two adjacent frequencies enables the utilization of relatively simple circuitry in the signal generating equipment and further results in a relatively narrow signaling frequency band.

The output point of each of the filters which corresponds to a respective one of the dial-off-normal frequencies is connected to a respective one of the party detectors D1 through D8 through a respective one of the B gates B1 through B8. The output of each B gate is also applied to the common digit counter 20 by way of an OR gate 19. Additionally, a conducting or enabling path is provided between each filter which corresponds to a respective one of the dial pulse frequencies and a respective one of the B gates B1 through B8, which path includes a respective one of the A gates A1 through A8. And finally there is a conducting or enabling path from each dial-off-normal filter to a respective one of the A gates.

The operation of the network shown in FIG. 1 is best explained by tracing a digit signal through it. For illustrative purposes let us assume that subscriber station set 1 has a 1000 cycle dial-off-normal frequency. Accordingly, during the dial rundown the signal frequency alternates between 1000 cycles and 900 cycles. When the dial goes off-normal, a relatively high level 1000 cycle signal is received at the amplifier-limiter 9. This signal captures the limiter, establishes the fundamental frequency of its output, and excites the 1000 cycle filter 10. Gate A8, which is shown closed or nonconducting in FIG. 1, is enabled or placed in a conducting condition by the direct-current output from filter 10, but the signal cannot reach the digit counter 20 or the party detector D8 since gate B8 still remains closed or nonconducting as shown. Gate A8 has a relatively slow release time and hence remains open for a preassigned period after the 1000 cycle signal is removed.

When the pulse contact on the dial at the subset 1 closes, the frequency shifts to 900 cycles and the corresponding filter or selective amplifier 11 is excited. Since the gate A8 with its slow release time is still open, it completes a path for the direct-current signal from the selective amplifier 11 to the gate B8 and thereby enables the gate B8 in anticipation of the shift to the dial-off-normal frequency. At the end of the 900 cycle pulse the 1000 cycle filter of the selective amplifier 10 is again excited and its output point is thus connected through the gate B8, which has a slow release action, to the party detector equipment D8 and to the digit counter 20 by way of the OR gate 19. After passing through the OR gate 19, the digit information may of course be amplified and used for normal dialing purposes by any suitable central office register, since the information is presented in the form of low level, direct-current pulses. The sequence of operations described above corresponds to the dialing of the digit 1. Since any other digit has a number of pulse contact closings equal to its own number, the sequence for the other digits is merely a repetition of that described for the digit 1.

In the circuit as shown in FIG. 1, the output of the 900 cycle filter not only opens the gate B8 in the 1000 cycle channel but apparently also opens the gate A7 in the 810 cycle channel. It is desirable to prevent such operation since it would increase the likelihood that a spurious 810 cycle signal might be passed by the 810 cycle filter 12 through the gate A7 so as to enable gate B7, thereby completing a path to the party detector D7. This need may be met simply by the addition of circuitry which prevents the simultaneous operation of any two A gates. An illustrative example of such circuitry is disclosed below herein in connection with the discussion of FIG. 5.

Figure 2:
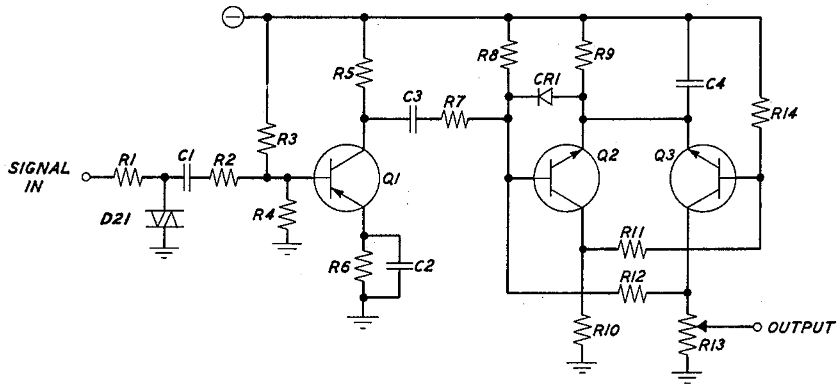
FIG. 2 is a schematic circuit diagram of the amplifier-limiter shown in FIG. 1.

A brief consideration of specific illustrative circuitry for an amplifier-limiter and for a selective amplifier will serve as a useful preface to a more detailed discussion of the sequence and timing of the operations performed by the A gates and B gates shown in FIG. 1. While persons skilled in the art may readily design an amplifier-limiter capable of performing the functions described above, it is known that the amplifier-limiter shown in FIG. 2 is particularly well suited for the purpose intended. Briefly, the circuit consists of three basic elements, a protective clipper, an amplifier, and a multivibrator. Signals entering from the line circuit transformer initially are applied to the base of the transistor Q1 by way of the resistors R1 and R2 and the capacitor C1. The diode 21 has symmetrical conducting characteristics and consequently clips both the positive and negative portions of the input wave which exceed a preassigned threshold so as to produce a square wave. Since it operates or clips only on relatively high signal voltages, the diode D21 acts as a protective device for the amplifier which follows.

The transistor Q1, together with its attendant bias elements, resistors R5 and R6 and capacitor C2, operates as a class A amplifier with an open circuit gain of approximately 30 decibels. Above its preassigned clipping level the amplifier overloads rapidly, causing additional clipping and limiting of the output signal. The output of the amplifying transistor Q1 is taken from its collector and is coupled through capacitor C3 and resistor R7 to the base of transistor Q2 which together with transistor Q3 and associated circuit elements form a bistable multivibrator which requires an input signal to switch in either direction. The bias conditions on the multivibrator are established to allow the circuit to switch just above and just below the zero level of the amplifier output; that is to say, it switches essentially at each zero crossing. The output amplitude is thus independent of input level and the dominant frequency is determined by the highest amplitude component of the input. The amplitude of the square wave at the output terminals may be adjusted to the desired level by the potentiometer R13. A range of approximately 0 to 20 volts, peak-to-peak, is available.

Figure 3:
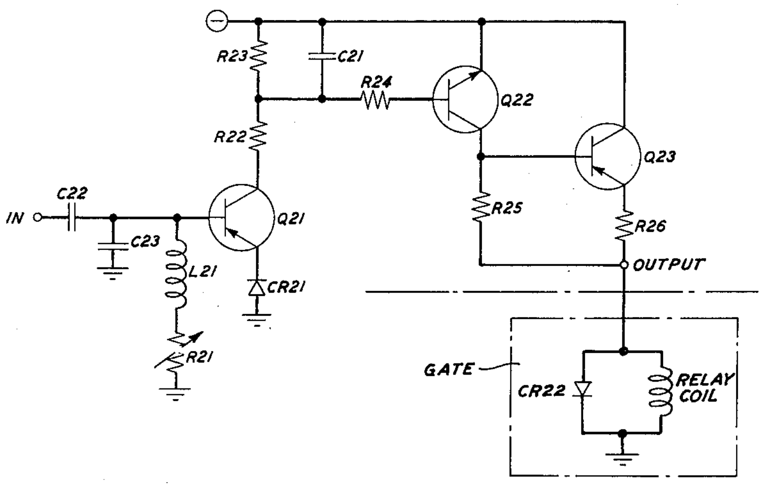
FIG. 3 is a schematic circuit diagram of one of the selective amplifiers shown in FIG. 1.

Turnnig now to FIG. 3, the selective amplifier, shown schematically, is representative of any one of the selective amplifiers 10 through 18 shown in block diagram form in FIG. 1. All of these amplifiers are identical except for the frequency range which is determined in each case by the magnitude of the elements comprising each respective resonant circuit. The resonant circuit shown, which is in effect a filter, comprises capacitors C22 and C23, inductor L21, and variable resistor R21. The resonant circuit yields a sinusoidal wave form at the fundamental frequency of the driving square wave from the amplifier-limiter shown in FIG. 2, assuming of course that the driving frequency is near the resonant frequency. The variable resistor R21 is used to adjust the bandwidth to a standardized value, thus compensating for the effects of component tolerances on selectivity. CR21 is a silicon diode which provides a threshold that greatly improves the frequency selectivity of the amplifier. Transistor Q21 is switched on by each negative peak of the resonant circuit voltage that exceeds the bias threshold. The output pulses from transistor Q21 appear across resistor R23 and establish a charge on capacitor C21. The voltage on capacitor C21 acts to switch transistor Q22 into a conducting condition and holds it ON during the entire alternating-current cycle. Transistor Q23 is a direct-current amplifier. Assuming that relays are employed for the gates of FIG. 1, the output from the transistor Q23 is applied to one of the relay coils as shown. The diode CR22 provides a return path for current in the relay coil for a preassigned period after amplifier cutoff which thereby effects the desired slow release action of the gate being operated.

Figure 4:
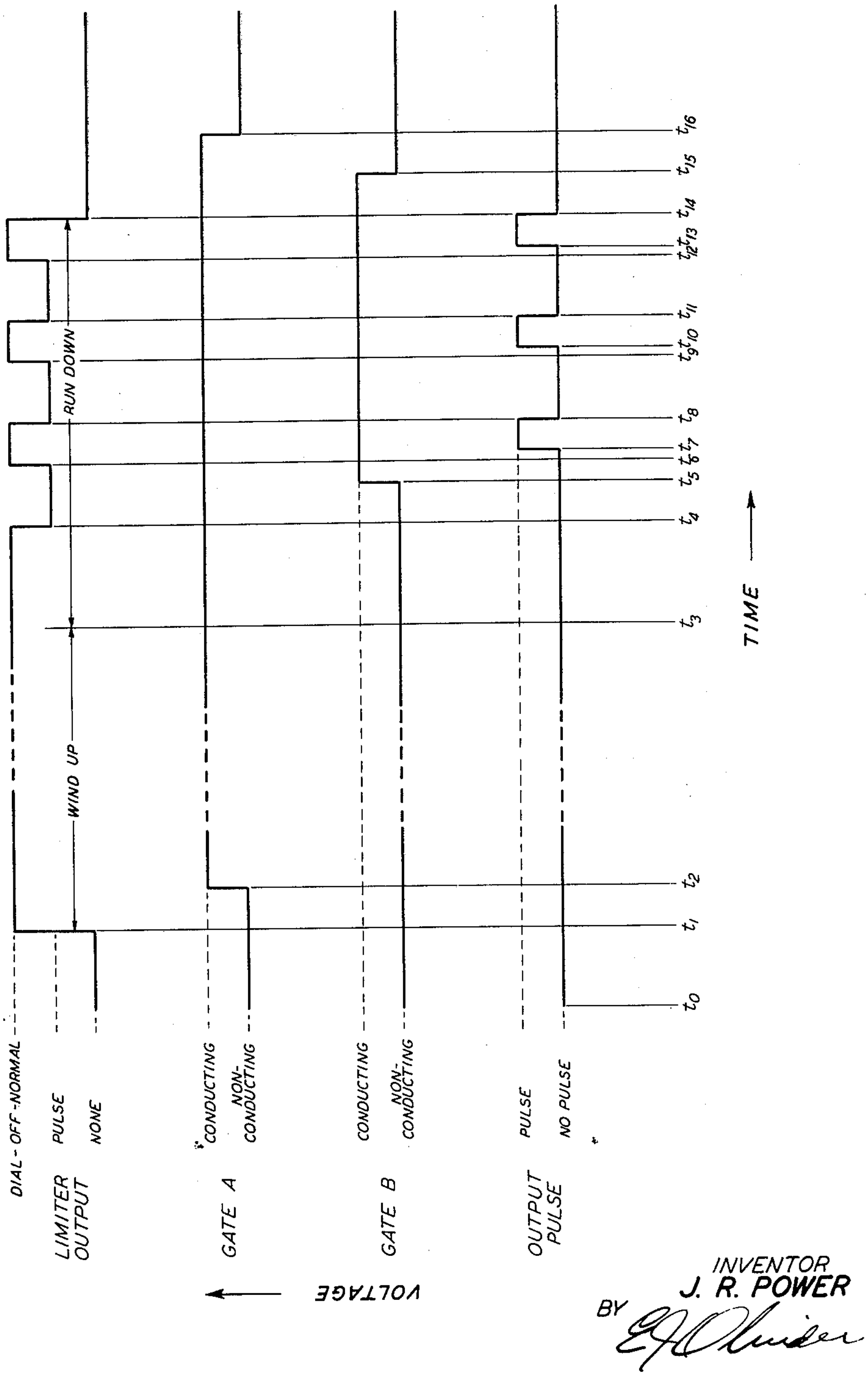
FIG. 4 is a sequence and timing plot of the operations performed by the equipment shown in FIG. 1.

Proceeding now to FIG. 4, the chart shown serves to illustrate in some detail the sequence and timing involved in the operations performed by the limiter, the selective amplifier, and by the A and B gates. Commencing at time $t_0$ the system is in its quiescent condition with no output from the limiter and both sets of gates in the nonconducting condition. At time $t_1$ the dial at one of the party-line station sets is moved off-normal and a corresponding dial-off-normal frequency pulse, which may have a fundamental frequency of 1000 cycles, for example, is shown at the limiter output. The time interval $t_1$—$t_2$, approximately 20 milliseconds, which occurs before the A gate switches to its conducting state, results in part from the build-up time of the resonant circuit comprising inductor L21 and capacitor C23 in the selective amplifier circuit shown in FIG. 3, and in part from the operate time of the A gate. The time $t_3$ marks the end of the dial windup period, which is typically on the order of .2 second, and also marks the beginning of the dial rundown period which, of course, varies in duration in accordance with the digit dialed. The time $t_3$—$t_4$ marks the dial rundown which occurs before the operation of the first pulsing contact, which operation shifts the limiter output from the dial-off-normal frequency to the pulse frequency. The delay interposed between the inception of the pulse frequency signal at the limiter output and the closing of the B gate, shown as interval $t_4$—$t_5$, results from the build-up time of the resonant circuit in the selective amplifier and from the inherent operating time of the B gate. After the first dial pulse signal, which appears at the limiter output as a 30 millisecond negative pulse terminating at time $t_6$, an interval of 20 milliseconds occurs before the inception of the second dial pulse at time $t_8$. Meanwhile, since both the A gate and the B gate are in their conducting states, an output pulse is initiated at time $t_7$, the interval $t_6$—$t_7$ representing the build-up time of the resonant circuit in the selective amplifier. At time $t_8$ the output pulse is shown terminating simultaneously with the inception of the second dial pulse since there is little or no hangover time in the selective amplifier. For the transmission of the digit 3, two additional output pulses occurring between time $t_{10}$—$t_{11}$ and $t_{13}$—$t_{14}$, respectively, are shown and the sequence of operations described for the generation of the first output pulse is repeated in each case. The time $t_{12}$—$t_{15}$, 40 milliseconds, represents the release time of the B gate and the time $t_{14}$—$t_{16}$, also 40 milliseconds, represents the release time of the A gate. It will be recalled that these relatively slow release times are introduced by the diode CR22 in the selective amplifier shown in FIG. 3, which provides a return path for current in the relay coil for the 40 millisecond period after amplifier cutoff. It will be understood that the duration of each of the specific time intervals referred to is wholly illustrative and is of no significance insofar as the principles of the invention are concerned.

Returning now to FIG. 1, the A and B gates shown have thus far been discussed in only general terms. It is evident, however, from the particular circuit connections in which they are employed and from the functions which they serve that the structure of the gates need not be limited to any one specific form. First, it will be apparent to persons skilled in the art that solid state devices such as diodes or transistors, for example, may be employed to perform the described functions of the A and B gates. Alternatively, wire spring relays may be advantageously employed to perform these functions and such employment is illustrated in FIG. 5.

Figure 5:
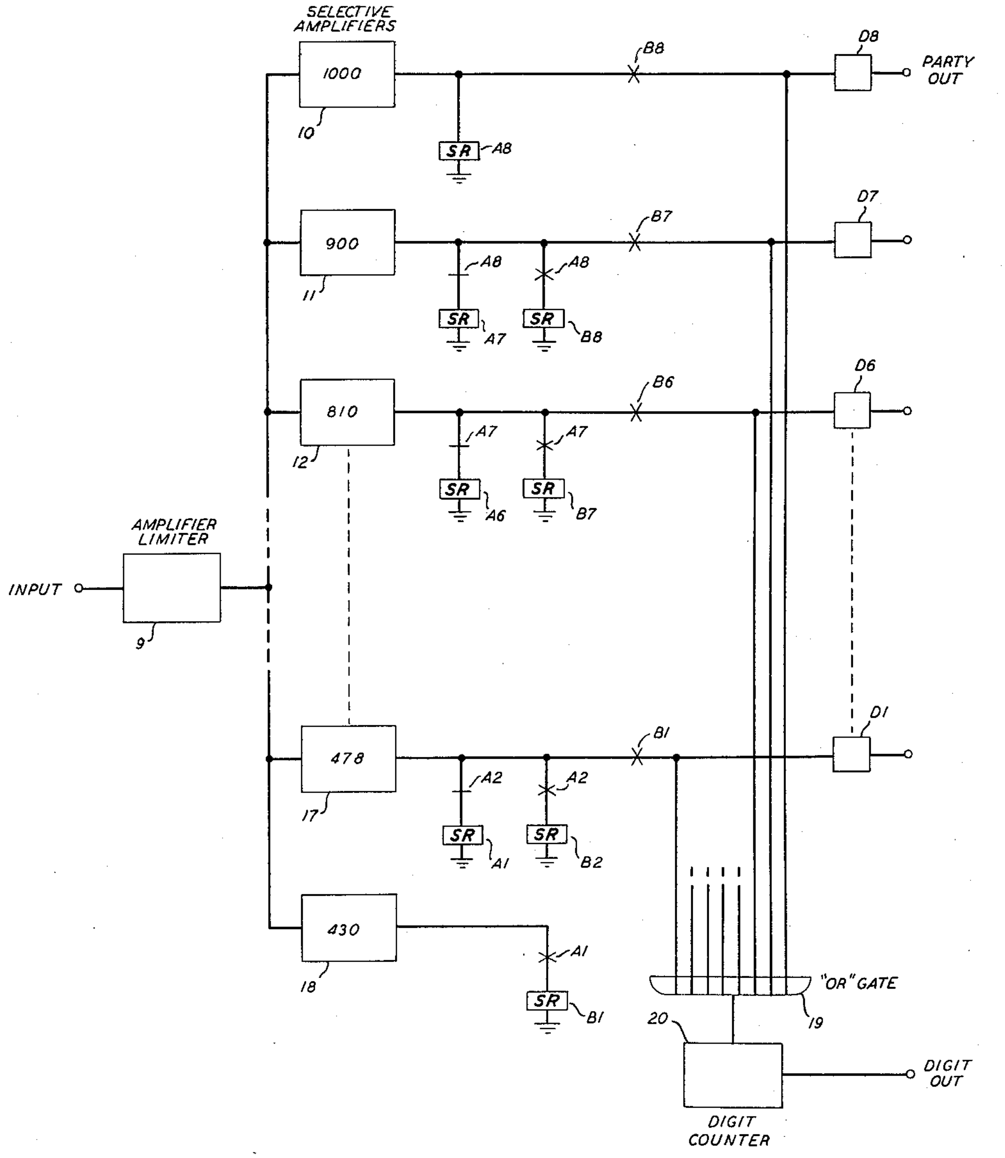
FIG. 5 is a block diagram of the system of FIG. 1 illustrating the employment of relay gates.

FIG. 5 is substantially identical to FIG. 1 with the exception that the block diagram form of the A and B gates shown in FIG. 1 has been replaced in each instance by a specific relay which includes a showing of the function of individual relay contacts. A specific example will suffice to illustrate the operation of the relay gates. Assuming a 900 cycle off-normal frequency is passed by the 900 cycle amplifier 11, the rectified output serves to operate relay A7. The transfer contacts on relay A7, which are shown as a dash line or break contact, switch the 810 cycle channel output path from relay A6 to relay B7 in readiness for the anticipated 810 cycle pulse frequency. This action serves to ensure that the only path which may be completed between one of the selective amplifiers and a party detector will be between the selective amplifier 11, the 900 cycle amplifier, and detector D7.

At the end of the first dial-off-normal (900 cycle) signal, relay A7 remains operated for approximately 40 milliseconds, as shown in FIG. 4. The frequency is immediately shifted to 810 cycles by the dial pulse contacts in the signal-transmitting station set. Output from the 810 cycle amplifier operates the B7 relay which also has a slow release. Finally, with both the A7 and B7 relay make contacts, each designated by an X, closed and remaining closed, the frequency returns to 900 cycles and an output pulse is delivered to the 900 cycle party identification detector D7 and through the OR gate 19 to the digit counter 20.

It is to be understood that the above-described arrangements are illustrative of the application of the principles of the invention. Numerous other arrangements may be devised by those skilled in the art without departing from the spirit and scope of the invention.

What is claimed is:

1. Apparatus for receiving and identifying each of a plurality of different signal groups, each of said groups comprising a sequence of at least three signals, alternate ones of said signals being of a first frequency and intermediate ones of said signals being of a second frequency, at least one of said frequencies in each of said groups being common to two of said groups, each of said groups employing a unique pair of said frequencies, said apparatus comprising, in combination, a plurality of means each responsive to signals of a respective one of said frequencies for generating an output signal, a plurality of means each responsive to a respective one of said output signals for detecting a corresponding one of said signal groups, a plurality of means for applying a respective one of said output signals to each of said detecting means, a plurality of means each responsive to a respective sequential pair of said output signals for enabling a respective one of said applying means, and means for preventing the simultaneous operation of any two of said enabling means.

2. Apparatus for receiving and identifying each of $n$ different signal groups, each of said groups comprising a sequence of at least three signals, alternate ones of said signals being of a first frequency and intermediate ones of said signals being of a second frequency, at least one of said frequencies in each of said groups being common to two of said groups, whereby a total of $n+1$ signal frequencies are employed, said apparatus comprising, in combination, a plurality of $n+1$ means each responsive to signals of a respective one of said frequencies for generating an output signal, a plurality of $n$ means each responsive to a respective one of said output signals for detecting a corresponding one of said signal groups, a plurality of $n$ means for applying each of $n$ of said output signals to a respective one of said detecting means, a plurality of $n$ means each responsive to a respective sequential pair of said output signals from a corresponding pair of said generating means for enabling a respective one of said applying means, and means for preventing the simultaneous operation of any two of said enabling means.

3. Apparatus for receiving and identifying each of a plurality of distinctive signal groups, each comprising a signal of a first frequency periodically interrupted by a signal of a second frequency, at least one of said frequencies in each of said groups being common to two of said groups, the total number of said frequencies exceeding the total number of said groups by one, said apparatus comprising, in combination, a plurality of means each selectively responsive to a respective one of said frequencies for generating a corresponding output signal, a plurality of means each responsive to a corresponding one of said output signals for identifying a respective one of said signal groups, a plurality of means for applying a respective one of said signals to each of said identifying means, a plurality of means each responsive to a sequence of two of said output signals, one from each of a respective pair of said signal generating means, for enabling a respective one of said signal applying means, and means for preventing the simultaneous operation of any two of said enabling means.

4. Apparatus in accordance with claim 3 wherein said signal generating means comprise a plurality of frequency selective amplifiers.

5. Apparatus in accordance with claim 3 wherein each of said identifying means comprises a respective detector.

6. Apparatus in accordance with claim 3 wherein each of said applying means comprises a respective first gate and wherein each of said enabling means comprises a respective second gate.

7. Apparatus in accordance with claim 6 wherein each of said gates comprises a respective relay.

8. In a telephone system employing subscriber subset dial signaling of a type wherein the dialing of each subset produces a unique signal of a first frequency interrupted periodically by a signal of a second frequency wherein the number of said interruptions is employed to represent the number of the digit dialed and wherein at least one of the signal frequencies of each subset is common to the two subsets, whereby the number of frequencies employed exceeds the number of said subsets by one, signal receiving apparatus comprising, in combination, a plurality of filter means each responsive to a respective one of said signal frequencies for developing a corresponding output signal, a plurality of means each responsive to a respective one of said output signals for identifying the dialing signals of a corresponding one of said subsets, means for applying a respective one of said output signals to each of said identifying means, and a plurality of means each responsive to a sequential pair of said output signals from a corresponding pair of said filter means for enabling a respective one of said applying means.

9. Apparatus as defined in claim 8 wherein said applying means comprises a first plurality of gates and wherein said enabling means comprises a second plurality of gates each operatively responsive for a period of preassigned duration to a respective one of said output signals, whereby one of said first plurality of gates and an associated one of said second plurality of gates are both enabled by a signal of a respective one of said first frequencies followed by a signal of the corresponding second frequency, and whereby each of said identifying means is made operative only by a signal combination of a respective one of said first frequencies interrupted by a respective one of said second frequencies, said signal combination occurring within said period of preassigned duration.

10. Communication signal receiving apparatus for identifying a signal combination of a first frequency, periodically interrupted by a signal of a second frequency, said apparatus comprising, in combination, first and second filter means each responsive to a respective one of said frequencies, said first filter including an input point and first and second output points, said second filter including an input point and an output point, first and second gates, each including a respective input point, a respective output point and a respective enabling input point, means connecting said first output point to the input point of said second gate, means connecting said second output point to the enabling input point of said second gate, means connecting the output of said second filter to the input of said first gate, means connecting the output of said first gate to the enabling input of said second gate, means for detecting signals of said first frequency, and means connecting the output of said second gate to said detecting means, whereby said detecting means is rendered operative by each sequential combination of a signal of said second frequency immediately preceded by and followed by a signal of said first frequency.

References Cited in the file of this patent

UNITED STATES PATENTS

| | | |
|---|---|---|
| 2,547,025 | Noble | Apr. 3, 1951 |
| 2,784,393 | Schultheis | Mar. 5, 1957 |
| 2,892,036 | Harris | June 23, 1959 |
| 2,929,880 | Koehler | Mar. 22, 1960 |
| 2,938,956 | Hinton et al. | May 31, 1960 |